United States Patent [19]

Rodriguez

[11] Patent Number: 5,665,853
[45] Date of Patent: Sep. 9, 1997

[54] DRY STRENGTH RESIN COMPOSITIONS

[75] Inventor: Jose M. Rodriguez, Eatonton, Ga.

[73] Assignee: Geo Speciality Chemicals, Inc., Cleveland, Ohio

[21] Appl. No.: 711,316

[22] Filed: Sep. 3, 1996

Related U.S. Application Data

[63] Continuation of Ser. No. 505,724, Jul. 21, 1995, abandoned.

[51] Int. Cl.$^6$ .......................... C08G 63/66; C08L 67/00
[52] U.S. Cl. .......................... 528/300; 528/245; 525/398; 524/593; 524/601; 162/164.1; 162/164.7
[58] Field of Search .......................... 524/593, 601; 528/300, 301; 525/398

[56] References Cited

U.S. PATENT DOCUMENTS

| | | | |
|---|---|---|---|
| 4,281,199 | 7/1981 | Langdon | 528/405 |
| 4,346,027 | 8/1982 | Van Eenam | 524/377 |
| 4,537,634 | 8/1985 | Floyd | 106/214 |
| 4,656,296 | 4/1987 | Floyd | 106/213 |
| 5,147,908 | 9/1992 | Floyd et al. | 524/503 |
| 5,378,757 | 1/1995 | Blount, Jr. et al. | 528/300 |
| 5,446,082 | 8/1995 | Asai et al. | 524/601 |
| 5,478,872 | 12/1995 | Yamasoe et al. | 524/596 |
| 5,510,148 | 4/1996 | Taljan et al. | 427/409 |
| 5,510,417 | 4/1996 | Tachika et al. | 524/601 |
| 5,518,764 | 5/1996 | Träubel et al. | 428/265 |

OTHER PUBLICATIONS

J. Marton, "Dry–Strength Additives".

Reynolds and Wasser, American Cyanamid Company, "Dry–Strength Resins".

*Primary Examiner*—Tae Yoon
*Attorney, Agent, or Firm*—Thompson Hine & Flory LLP

[57] ABSTRACT

The tensile strength properties of paper are improved by adding to paper stock a resin composition comprising a water-soluble polymer containing a polyhydric alcohol such as sorbitol in the backbone of the polymeric molecule.

3 Claims, No Drawings

DRY STRENGTH RESIN COMPOSITIONS

This application is a continuation of application Ser. No. 08/505,724 filed on Jul. 21, 1995, abandoned.

BACKGROUND OF THE INVENTION

1.0 Field of the Invention

The present invention relates to resin compositions adapted to be applied to fibrous substrates so as to improve their physical properties, notably the dry strength of paper substrates.

It is desirable to improve the dry strength properties of paper and paperboard. The dry strength properties of paper and paperboard are governed by their structural elements such as fiber strength and fiber-fiber bonding, as well as other factors including fiber length, sheet formation, sheet flaws, etc. In order to improve the internal dry strength properties of paper and paperboard, chemical additives are typically added thereto. The primary purpose of such chemical additives is to augment fiber-fiber bonding in the paper sheet. Interfiber hydrogen bonds form as a natural result of drying a wet paper web. Although the degree of interfiber bonding can be controlled through mechanical refining such as beating, nonfibrous additives that can enhance interfiber bonding are constantly sought.

2.0 Discussion of Related Art

In an effort to improve the dry strength properties of paper, synthetic resins were first used in the early 1940's and 1950's, such as for example, acrylamide polymers. Polymers of polyacrylamide were found to possess unique properties that made them especially effective as dry-strength resins. While other types of synthetic dry-strength resins are reported in the literature, commercial products are primarily based on acrylamide.

There are many benefits to be gained from the use of dry-strength additives. Refining can be reduced while maintaining paper strength, resulting in energy savings and increased production. Strength properties can be maintained while substituting a lower-strength, lower-cost furnish. In addition, dry strength can be increased without a corresponding increase in apparent density, as would be the case with increased refining.

In addition to the afore-mentioned acrylamide polymers, various other compositions have been reported as providing dry-strength properties. Most of these compositions can be classified as being cationic non-acrylamide-containing polymers, for example, vinyl pyridine and copolymers thereof, vinyl sulfonium polymers, polyacrylic hydrazide, cationic acrylate copolymers, polyvinylimidazoline, and condensation polymers of polyamines, ketones and aldehydes. Other dry-strength additives include water-soluble, hydrophilic natural polymers such as starch, vegetable gums, and carboxymethyl cellulose. However, there is a continuing need to provide dry-strength paper additives having improved properties.

3.0 Description of the Invention

The present invention is directed to resin compositions which are extremely useful in the production of paper products and which provide excellent dry strength properties to paper and paperboard. More particularly, the present invention is directed to resin compositions comprising water-soluble polymers containing a polyhydric alcohol such as sorbitol in the backbone of the polymeric molecule. It has been found that such water-soluble polymers improve the degree of bonding between paper fibers and accordingly increase the dry and the wet strength properties of paper and paperboard.

The water-soluble polymers of this invention containing a polyhydric alcohol such as sorbitol in the backbone of the polymeric molecule are preferably those wherein the polymer backbone comprises polyhydric alcohols and an alkylamine such as diamines or triamines, diacids, glyoxal, citric acid or formaldehyde.

In addition to sorbitol, polyhydric alcohols having from 2 to 6 carbon atoms may be employed as a monomeric polyol, including mannitol and ethylene glycol.

More specifically, the present invention is directed to a resin composition containing from about 30% to about 90% by weight of a polyhydric alcohol, copolymerized with from about 10% to about 70% by weight of a co-monomer. The preferred co-monomers copolymerized with a polyhydric alcohol such as sorbitol include citric acid, a diacid, glyoxal, formaldehyde, and an alkylamine such as diamine or triamine.

The resin composition of the present invention may be prepared by conventional condensation polymerization techniques. Resin slurries thereof may be prepared by diluting the resin solutions with water to a resin concentration of typically less than about 1% by weight. The dilute solution is added to the pulp slurry in an amount to provide from about 0.1% to about 5% by weight of the resin based on dry paper fiber. The pH of the solution can be reduced by the addition of a mineral or organic acid to less than about 3 to increase the reactivity of the resin, if desired.

To realize the maximum potential of the resin composition of this invention, control of the process variables is important. For example, best results are obtained when the resin compositions are added to the paper pulp at the wet-end during the papermaking process. However, the resin compositions may also be added to the paper pulp at the size press.

The following examples illustrate the preparation of resin compositions within this invention and their use as dry strength paper additives, but are not intended to be limitations thereof.

EXAMPLE 1

A 1500 ml round bottom reaction flask was charged with about 670.32 grams of sorbitol and about 379.68 grams of diethyltriamine. A nitrogen sparge was started and the flask contents were heated to 155° C. under a slight vacuum for about 10 hours. The resulting polymer had a solids content of about 50%/wt, and a Brookfield viscosity (no. 1 spindle, 20 rpm @25° C.) of about 15 cps.

EXAMPLE 2

A 1500 ml round bottom reaction flask was charged with about 489.83 grams of sorbitol, about 390.17 grams of 40% glyoxal in water and about 220 grams of water. The pH of the mixture was adjusted to about 2.0 and the flask contents was heated to about 95° C. After about 5 hours of heating, additional glyoxal was added to the flask to provide about 2 moles of glyoxal per mole of sorbitol. The reaction mixture was heated an additional three hours. Viscosity of the reaction mixture did not increase, thus about 200 grams of DMSO was added to the flask and full vacuum was applied to remove the water while reducing the flask temperature to about 65° C. After about 15.5 hours, viscosity increased from about 408 to about 5,208 cps and the reaction was stopped.

EXAMPLE 3

A 1500 ml round bottom reaction flask was charged with about 469.76 grams of sorbitol, about 330.24 grams of citric acid, about 200 grams of water, and about 0.8 gram of methane sulfonic acid (MSA) as a catalyst. The flask contents was heated to about 140° C. under about 24 inches of vacuum to remove the water. After about 1 hour, about 300 grams of water was added to the flask and the solution was neutralized to a pH of about 7.0.

EXAMPLE 4

A 1500 ml round bottom reaction flask was charged with about 591.92 grams of sorbitol, about 208.08 grams of citric acid, about 200 grams of water and about 0.8 gram of MSA catalyst. The flask contents was heated to about 120° C. for about 8 hours under vacuum, then neutralized to a pH of about 7.0 and solubilized in DMSO.

EXAMPLE 5

The resin compositions prepared in Examples 1 to 4 were evaluated for dry strength properties and compared with starch and a blank as follows. A deinked, recycled pulp slurry containing about 3.2%/wt solids was diluted to about 0.5%/wt solids. A dosage of about 10 pounds of the resin composition of Examples 1 to 4 or starch per ton of pulp slurry solids on a dry paper weight basis was added to about 1,000 ml aliquots of the pulp slurry. After mixing, the 1,000 ml aliquots were added to an 8 inch square Noble and Woods handsheet mold to make a 5 gram oven dry handsheet. The sheets were pressed on a roller felt press and dried on a felted dryer. The sheets were cured for about 15 minutes at about 105° C. and then cut into 1"×4" strips. Dry tensile strength was measured on the strips using a Thwing-Albert electronic tensile tester. As indicated above, test strips were also prepared containing 10 pounds per ton paper of starch, a conventional dry strength additive, and blank test strips containing no dry strength additive. The test results are shown below in Table I. The performance of the resin compositions is expressed as a percentage increase over the dry strength of handsheets made without additives.

TABLE I

| Dry Strength Resin | Dry Tensile psi | % Increase Dry Strength |
| --- | --- | --- |
| Example 1 | 27.5 | 10.9 |
| Example 2 | 27.0 | 8.9 |
| Example 3 | 27.9 | 12.5 |
| Example 4 | 26.7 | 7.7 |
| Starch | 24.5 | 0 |
| Blank | 24.8 | 0 |

It can be seen from the test results shown in Table I that the resin compositions of Examples 1 to 4 all provided a substantial improvement in dry strength properties to paper fiber.

EXAMPLE 6

To a bleached pulp slurry containing about 3.6% by weight solids was added a dosage of about 8 pounds of Fibrabon 33 (polyaminoamide-epichlorohydrin resin, available from Henkel Corporation, Ambler, Pa.) per ton of pulp slurry solids. The mixture was diluted to about 0.5% by weight pulp slurry solids, and divided into 1,000 ml aliquots. To each aliquot was added a dosage of about 8 pounds of the resin compositions of Examples 1, 3 and 4 per ton of pulp paper solids on a dry paper weight basis. After mixing, the 1,000 ml aliquots were added to an 8 inch square Noble and Woods handsheet mold to make a 5 gram oven dry handsheet. The sheets were pressed on a roller felt press and dried on a felted dryer. The sheets were cured for about 15 minutes at about 105° C. and then cut into 1"×4" strips. Wet and dry tensile strength was measured on the strips using a Thwing-Albert electronic tensile tester. The test results are shown below in Table II.

TABLE II

| Resin Composition | Dry Tensile psi | % Increase Dry Strength |
| --- | --- | --- |
| Blank | 43.0 | — |
| Fibrabon 33 | 51.2 | 19.07 |
| Example 1 | 56.3 | 30.93 |
| Example 3 | 58.9 | 36.98 |
| Example 4 | 57.6 | 33.95 |

It can be seen from the test results shown in Table II that the resin compositions of Examples 1, 3 and 4 all provided a substantial improvement in dry strength properties to paper fiber.

What is claimed is:

1. A resin composition consisting of a water-soluble polymer molecule wherein the backbone of said polymer molecule consists of sorbitol copolymerized with a co-monomer selected from the group consisting of an alkylamine, citric acid, and formaldehyde.

2. A resin composition as in claim 1 wherein said alkylamine is selected from the group consisting of diamines and triamines.

3. A resin composition as in claim 1 consisting of from about 30% to about 90% by weight of sorbitol and from about 70% to about 10% by weight of said co-monomer.

* * * * *